United States Patent [19]
Piguet

[11] 3,941,439
[45] Mar. 2, 1976

[54] SHOCK ABSORBER BEARING ASSEMBLY

[75] Inventor: Paul Piguet, La Chaux-de-Fonds, Switzerland

[73] Assignee: Portescap, La Chaux-de-Fonds, Switzerland

[22] Filed: Feb. 27, 1975

[21] Appl. No.: 553,632

[30] Foreign Application Priority Data

Feb. 27, 1974 Switzerland ........................ 2755/74

[52] U.S. Cl. ................................ 308/159; 58/140 A
[51] Int. Cl.²F16C 17/06; F16C 17/08; F16C 19/10; F16C 19/30
[58] Field of Search ............... 308/2, 159; 58/140 A

[56] References Cited

UNITED STATES PATENTS

| | | | |
|---|---|---|---|
| 1,310,038 | 7/1919 | Stewart | 308/159 |
| 2,525,525 | 10/1950 | Colomb | 308/159 |
| 2,720,077 | 10/1955 | Stein | 308/159 |
| 2,891,379 | 6/1959 | Seitz | 58/140 A |
| 3,036,871 | 5/1962 | Matthey | 308/159 |
| 3,590,575 | 7/1971 | Eckenrode | 58/140 A |
| 3,758,178 | 9/1973 | Meylan-Rochat | 308/159 |

*Primary Examiner*—Lloyd L. King
*Attorney, Agent, or Firm*—Arthur V. Smith; Pasquale A. Razzano

[57] ABSTRACT

A shock absorber bearing assembly is disclosed which includes a shaft having a pivot end portion with a pivot end, a bearing housing having an opening therein through which the pivot end portion of the shaft extends; and a bearing mounted on the housing and having an aperture formed therein for receiving the end pivot section of the shaft. An enlargement is formed on the shaft below the end pivot section and is located in the housing opening. The latter has a first cylindrical section and a second tapered section between the cylindrical section and the bearing so that side play of the shaft between the enlargement and the housing opening decreases as the end pivot section moves out of the bearing during a shock load in order to automatically keep the shaft end centered with the bearing. In addition the shaft enlargement and housing opening are dimensioned to prevent the shaft end from engaging the bearing when the shaft end moves outwardly of the bearing, thereby to prevent damage to both the bearing and the shaft.

6 Claims, 3 Drawing Figures

SHOCK ABSORBER BEARING ASSEMBLY

The present invention relates to a bearing assembly, and more particularly to a bearing and a specially formed shaft end received in the bearing for use in a precision instrument such as a watch.

The bearing assembly of the present invention includes a bearing mount or housing having an opening formed therein for receiving the end portion of an axle, e.g. the axle or shaft of a watch balance wheel. A bearing element is mounted in the assembly housing and has an aperture or recess formed therein for receiving the axle pivot. The bearing is capable of moving or elastically changing form when affected by a shock transmitted by the pivot. The shock-absorber bearing and its associated balance wheel shaft are designed in such a way as to prevent the pivot end of the shaft from coming out of its support aperture in the bearing.

With many presently available bearing structures for precision instruments, in the event of a violent shock, it happens that the general form of the bearing assembly, and particularly the bottom plate, give way or move so that the axial distance between the bearings on opposite ends of a shaft increases in such a manner that at least one of the ends of the shaft or axle can come out of its bearing and bearing housing. After the shock, when the axle or shaft returns to its normal position, its pivot end is usually no longer aligned with its associated supporting recess in the bearing. As a result, at the moment when the pivot penetrates into the bearing recess once again, it can damage either the entry wall of the bearing or even itself, depending on the type of bearing and hardness of the materials used.

In accordance with the present invention, these drawbacks are overcome by a bearing assembly constructed so that the shaft pivot end is precentered in relation to its supporting recess or aperture in its associated bearing. For this purpose, the bearing assembly according to the present invention includes a pivot shaft, e.g. a balance wheel axle, having an extension end portion of predetermined configuration including a boss located between a cylindrical portion of the extension and a bead portion which connects the boss to the pivot end portion of the shaft. In addition the bearing housing or mount has an opening formed therein which includes an outside cylindrical portion adjacent one side thereof and an interior flared portion which is formed as to afford to the shank a side play which progressively decreases as the pivot end portion of the shaft moves axially away from its normal working position toward the outside of the bearing. The difference between the largest diameter of the shaft boss and the smallest diameter of the cylindrical portion of the housing opening is equal to or less than the difference between (a) the diameter of the tapered pivot support aperture in the bearing (which normally receives the pivot end of the shaft) at the elevation which the free edge of the pivot end of the shaft is at when the largest diameter of the shaft boss is at the height of the inside end of the cylindrical portion of the housing opening, and (b) the diameter of the pivot end portion of the shaft.

The above, and other objects, features and advantages of the present invention will be apparent in the following detailed description of an illustrative embodiment thereof which is to be read in connection with the accompanying drawings wherein.

Figure 1:
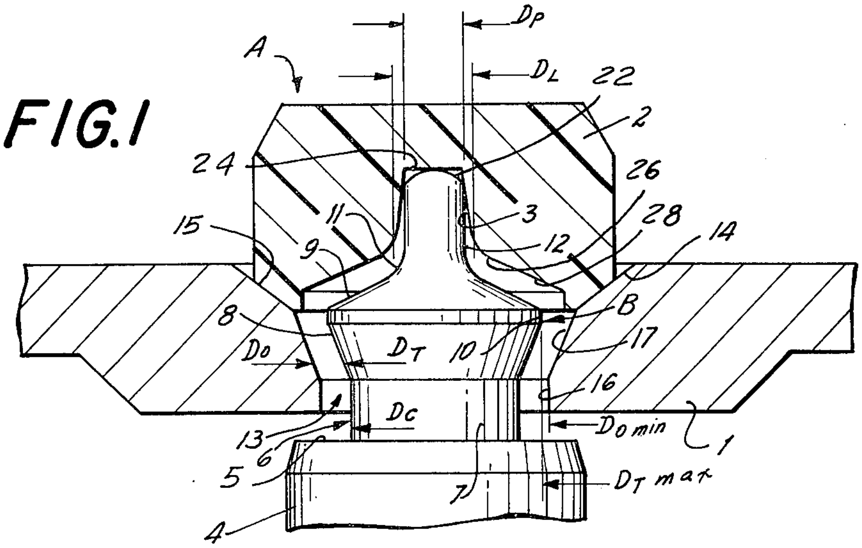
FIG. 1 is an elevational view, in section, of a bearing assembly constructed in accordance with the present invention showing the normal operating positions of the elements thereof.
Figure 3:
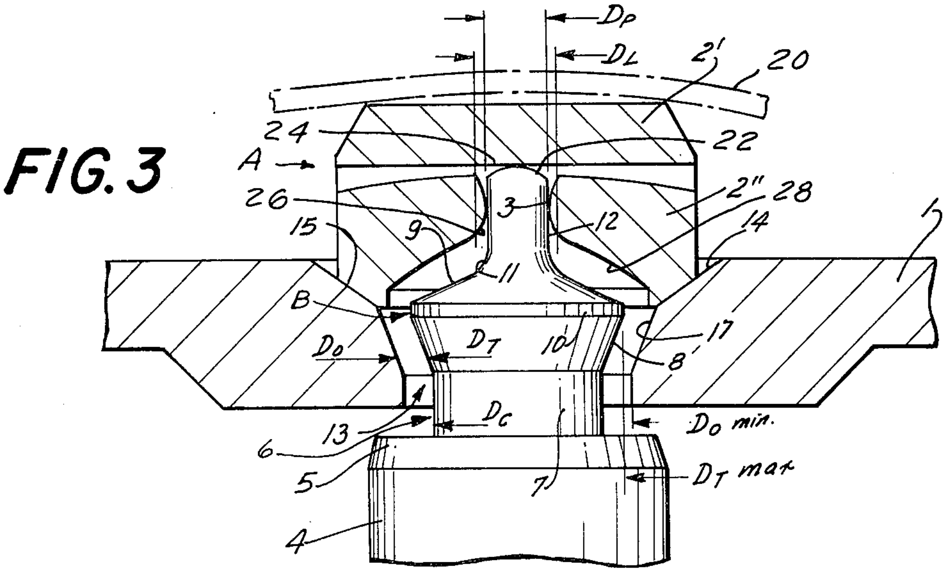
FIG. 3 is a sectional view similar to FIG. 1 showing another embodiment of the invention using a two piece jewel bearing.

Referring now to the drawing in detail, and initially to FIG. 1, it is seen that a bearing assembly A includes a bearing mounting frame or housing 1 and a bearing 2 mounted therein. The bearing may be formed, for example, as a one piece element from any suitable plastic material. Alternatively, the bearing 2 can be formed from two jewel bearing elements 2′ and 2″, in the conventional manner, as seen in FIG. 3. In either case bearing 2 has a slightly tapered hole or aperture 3 formed therein which is adapted to rotatably receive and support the end of a shaft.

In the illustrative embodiment of the invention the bearing assembly is used with the balance wheel shaft or axle 4 of a watch. The free end of the shaft has a recessed shoulder 5 formed thereon and an integral extension portion 6. The latter is connected by a smoothly curved transition bead portion 11 to the pivot end portion 12 of the shaft. The shaft extension 6 includes a cylindrical portion 7 and a boss or enlargement B which may be formed, for example, from two axially aligned frustro-conical surfaces 8 and 9 separated by a short integral cylindrical section 10 which defines the largest diameter of the shaft extension portion 6.

Figure 2:
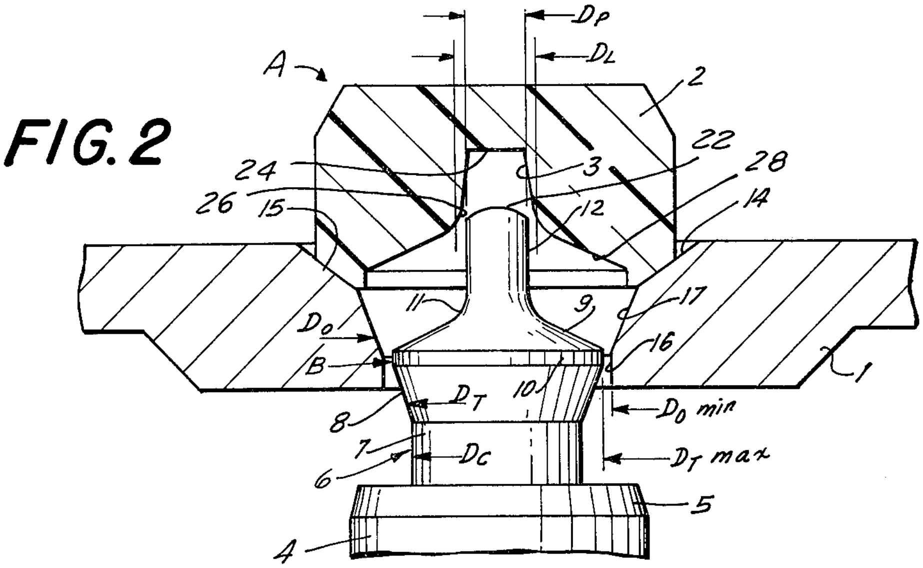
FIG. 2 is a sectional view, similar to FIG. 1, but showing the axle or shaft of the assembly as displaced by a shock.

FIGS. 1 and 2 show two possible positions for the bearing elements; FIG. 1 shows the normal working position and FIG. 2 shows the limit position in which the pivot end of the shaft has come right out of the opening 3 in bearing 2 or is about to penetrate back into the bearing.

Housing 1 has a central opening or bore 13 which receives the extension portion 6 of the shaft. The upper portion of opening 13 is formed as a frusto-conical surface 14 which is generally complementary to and receives the frustro-conical surface portion 15 on the lower side of bearing 2. When a shock is transmitted to the bearing 2 by the balance wheel shaft 4, the bearing can move in axial and radial directions and will return immediately to its rest position by the action of some elastic means (such as for example, its own elasticity in the case of an elastic bearing or a conventional cooperating spring structure 20, which normally overlies the two piece jewel-type bearing shown in FIG. 3). The conical corresponding surfaces 14, 15 of the housing 1 and of the bearing act as cooperating guides to properly return the bearing to its centered position.

The lower portion of the opening 13 in housing 1 (i.e. the portion through which the shaft extends) is formed as a generally cylindrical bore portion 16, which is followed by an axially aligned flaring or frustro-conical portion 17 located in alignment with the guide surface 14.

The relations required between the different axial and radial dimensions of the shaft extension portion 6 and of the opening 13 in housing 1, in order to avoid damage to the shaft pivot end 12, are as follows. The difference between the diameter $D_{O\ min}$ of the cylindrical portion 16 of bore 13 and the largest diameter $D_T$ $_{max}$ of the shaft extension 6 (at section 10) is equal to or less than the difference between (a) the diameter $D_L$ of the tapered pivot aperture 3 as measured at the elevation at which the extreme free edge 22 of the pivot end 12 of the shaft is located when the section 10 of the shaft extension 6 is at the elevation of the interior end of the cylindrical bore portion 16 in housing 1 (as shown in FIG. 2), and (b) the diameter $D_P$ of the pivot end portion 12 of the shaft. This relation can be expressed as follows:

$$D_{O\ min} - D_{T.max} \leqslant D_L - D_P$$

It will be apparent that with these limitations, when the pivot end 12 of the shaft moves downwardly out of recess 3 the section 10 of the shaft extension will be within the cylindrical portion 16 of housing bore 13 so that any sideward movement of shaft 4 will cause section 10 to engage the side wall of bore portion 16 to limit further sideward movement. In that position the free end is held spaced from the lower surface portion 28 of the bearing bore 3 and damage thereto by sideward movement of the shaft is avoided.

In addition, the difference between the diameter $D_O$ of the flared portion 17 of bore 13 and the diameter $D_T$ of the tapered portion 8 of enlargement 6, as measured at the same axial elevation in the normal working position of the shaft, i.e. with the free end 22 of pivot end 12 touching the bottom 24 of the recess 3 in bearing 2, is equal to or greater than the difference between the diameters $D_{O\ min}$ and $D_C$ of the cylindrical portions 16 of opening 13 and 7 of extension 6. This can also be expressed as follows:

$$D_O - D_T \geqslant D_{O\ min} - D_C$$

By this limitation, even upon extreme sideward movement of shaft 4, the surfaces 8, 17 will not touch and thus will not damage each other or interfere with rotation of the shaft.

In normal working position of the shaft 4, shown in FIGS. 1 and 3, the operation of the bearing assembly at the time of shaft movements inwardly toward the bearing 2 is the same as known bearings of this type, i.e. shoulder 5 engages housing 1 to limit such inward movement. The inside of the flared portion 17 of the housing opening 13 also enables, in this case, sideward movement of the shaft until the cylindrical portion 7 of the shaft abuts against the cylindrical portion 16 of the housing opening 13.

However, if the pivot end portion 12, having been subjected to a violent shock, tends to come out of the bottom end 26 of the bearing aperture 3, then the cylindrical portion 16 of housing opening 13 and the tapered enlargement 6 (particularly surface 8) work together to guide and center the pivot end 12 before it returns and reenters bearing aperture 3. Moreover, as seen in FIG. 2 the pivot end 12 cannot hit against the flared outside surface 28 of the bearing gear opening 3 because the play limitations on the different elements are defined as described above. Thus damage to the pivot end portion of the shaft is avoided.

Of course, it will be appreciated that the bearings at opposite ends of the shaft 4, and the corresponding end extensions of the balance wheel shaft must be formed as described to obtain the effect desired in the two axial directions of movement.

Although an illustrative embodiment of the present invention has been described herein with reference to the accompanying drawings, it will be understood that various changes and modifications may be effected therein by those skilled in the art without departing from the scope or spirit of the invention.

What is claimed is:

1. A shock-absorber bearing assembly comprising, a shaft having a pivot end portion including an end pivot section; a bearing housing having an opening therein through which said pivot end portion of the shaft extends; and a bearing mounted on said housing and having an aperture formed therein for receiving the end pivot section of the shaft; said shaft having an enlargement formed thereon below said end pivot section and located within said opening in the housing, said opening in said housing having a first cylindrical section and a second axially aligned tapered section between said cylindrical section and the bearing mounted thereon, said tapered section tapering from a minimum diameter adjacent said cylindrical section to a maximum diameter adjacent said bearing whereby side play between said enlargement and the sides of the opening in the housing progressively decreases as the end pivot section is moved away from the bearing out of the aperture therein.

2. The bearing assembly as defined in claim 1 wherein the difference between the largest diameter of said shaft enlargement and the diameter of said cylindrical section of the housing opening is equal to or less than the difference between (a) the diameter of the aperture in said bearing at the elevation at which the end of the end pivot section is located when the largest diameter of said enlargement is adjacent said cylindrical portion of the housing opening and (b) the diameter of said end pivot section of the shaft whereby sideward movement of the shaft will be limited by engagement of the shaft enlargement with the cylindrical portion of the housing opening to prevent contact between and damage to the end pivot section of the shaft and the bearing.

3. The bearing assembly as defined in claim 2 wherein said shaft enlargement comprises a pair of oppositely directed frustro-conical shaft sections having their bases located adjacent each other to define the largest diameter of said enlargement.

4. The bearing assembly as defined in claim 3 wherein said enlargement includes a narrow cylindrical section between the bases of said frustro-conical shaft section.

5. The bearing assembly as defined in claim 3 wherein said shaft, below said pivot end portion has a diameter which is larger than that of said housing opening and includes a cylindrical section between said enlargement and the remainder of the shaft thereby to define an annular shoulder on the shaft for cooperating with the housing to limit axial movement of the shaft towards the bearing.

6. The bearing assembly as defined in claim 5 wherein the difference between the diameter of the tapered section of said housing opening and the adjacent frustro-conical section of said enlargement measured at the same axial elevation in the normal working position of said shaft is equal to or greater than the difference between the diameters of the cylindrical portion of said housing opening and said cylindrical section of the shaft whereby said tapered section of said housing opening will not contact said enlargement even on extreme sideward movement of the shaft.

* * * * *